(12) United States Patent
Larson et al.

(10) Patent No.: US 9,519,709 B2
(45) Date of Patent: Dec. 13, 2016

(54) DETERMINATION OF AN ORDERED SET OF SEPARATE VIDEOS

(71) Applicant: HERE Global B.V., LB Veldhoven (NL)

(72) Inventors: Brody Larson, San Mateo, CA (US); Sebastian Frey, Woodland Hills, CA (US); Pascal Wever, Los Angeles, CA (US); David Vegezzi, Santa Monica, CA (US)

(73) Assignee: HERE Global B.V., Eindhoven (NL)

( * ) Notice: Subject to any disclaimer, the term of this patent is extended or adjusted under 35 U.S.C. 154(b) by 331 days.

(21) Appl. No.: 14/206,599

(22) Filed: Mar. 12, 2014

(65) Prior Publication Data

US 2015/0264224 A1    Sep. 17, 2015

(51) Int. Cl.
- *H04N 5/14* (2006.01)
- *G06F 17/30* (2006.01)
- *G11B 27/00* (2006.01)
- *H04N 5/77* (2006.01)
- *H04N 9/804* (2006.01)
- *H04N 9/82* (2006.01)

(52) U.S. Cl.
CPC ......... *G06F 17/30781* (2013.01); *G11B 27/00* (2013.01); *H04N 5/77* (2013.01); *H04N 9/8042* (2013.01); *H04N 9/8205* (2013.01)

(58) Field of Classification Search
None
See application file for complete search history.

(56) References Cited

U.S. PATENT DOCUMENTS

| 2007/0204238 A1 | 8/2007 | Hua et al. |
| 2009/0058822 A1 | 3/2009 | Chaudhri |
| 2009/0064048 A1 | 3/2009 | Bhattacharya |
| 2012/0321280 A1* | 12/2012 | Lin ..................... G11B 27/105 386/240 |
| 2013/0132374 A1 | 5/2013 | Olstad et al. |

OTHER PUBLICATIONS

"Adobe Prelude CS6 Streamlines Tapeless Video Handling", Macworld, Retrieved on Mar. 13, 2014, Webpage available at : http://www.macworld.com/article/1167421/adobe_prelude_cs6_streamlines_tapeless_video_handling.html.
(Continued)

*Primary Examiner* — Kate Luo
(74) *Attorney, Agent, or Firm* — Lempia Summerfield Katz LLC

(57) ABSTRACT

A method comprising determining an ordered set of separate videos that comprises a first video and a second video, identifying a first video segment comprised by the first video, determining an ordered set representation that indicates the ordered set of separate videos, the ordered set representation comprising a first representative image that represents the first video and a second representative image that represents the second video, causing display of the ordered set representation, receiving information indicative a scrub input, causing movement between the ordered set representation and an index point based on the scrub input, determining that the index point is aligned with the first representative image determining a rendering position based the first representative image, identifying a frame of the first video segment, and causing display of a frame image in a video rendering region is disclosed.

18 Claims, 10 Drawing Sheets

(56) References Cited

OTHER PUBLICATIONS

"Viewing the Highlights of an Event", HTC, Retrieved on Mar. 13, 2014, Webpage available at: http://www.htc.com/www/support/htc-one/howto/365287.html.
"Qwiki", Retrieved on Mar. 13, 2014, Webpage available at: http://www.qwiki.com/.
"Lumify", Retrieved on Mar. 13, 2014, Webpage available at: http://www.lumify.me/.

* cited by examiner

DETERMINATION OF AN ORDERED SET OF SEPARATE VIDEOS

TECHNICAL FIELD

The present application relates generally to determination of an ordered set of separate videos.

BACKGROUND

As electronic apparatuses become increasingly prevalent in our society, many users have become increasingly dependent on their electronic apparatus in daily life. For example, a user may desire to view video content by way of the user's electronic apparatus. As such, it may be desirable to configure an electronic apparatus such that a user of the electronic apparatus may view such video content in an intuitive and exciting manner.

SUMMARY

Various aspects of examples of the invention are set out in the claims.

One or more embodiments may provide an apparatus, a computer readable medium, a non-transitory computer readable medium, a computer program product, and/or a method for determining an ordered set of separate videos that comprises a first video and a second video such that the first video is adjacent to the second video in the ordered set of separate videos, identifying a first video segment comprised by the first video that is less than an entirety of the first video, determining an ordered set representation that indicates the ordered set of separate videos, the ordered set representation comprising a first representative image that represents, at least a portion of, the first video and a second representative image that represents, at least part of, the second video, such that the first representative image and the second representative image are arranged along an axis in accordance with an ordering of the ordered set of separate videos, causing display of at least part of the ordered set representation proximate to a video rendering region of a display, receiving information indicative a scrub input associated with the ordered set representation, causing movement between the ordered set representation and an index point based, at least in part, on the scrub input, determining that the index point is aligned with a portion of the first representative image along the axis, determining a rendering position based, at least in part, on the portion of the first representative image, identifying a frame of the first video segment such that the frame of the first video segment corresponds with the rendering position, and causing display of a frame image in the video rendering region, the frame image representing the frame of the first video segment.

One or more embodiments may provide an apparatus, a computer readable medium, a computer program product, and/or a non-transitory computer readable medium having means for determining an ordered set of separate videos that comprises a first video and a second video such that the first video is adjacent to the second video in the ordered set of separate videos, means for identifying a first video segment comprised by the first video that is less than an entirety of the first video, means for determining an ordered set representation that indicates the ordered set of separate videos, the ordered set representation comprising a first representative image that represents, at least a portion of, the first video and a second representative image that represents, at least part of, the second video, such that the first representative image and the second representative image are arranged along an axis in accordance with an ordering of the ordered set of separate videos, means for causing display of at least part of the ordered set representation proximate to a video rendering region of a display, means for receiving information indicative a scrub input associated with the ordered set representation, means for causing movement between the ordered set representation and an index point based, at least in part, on the scrub input, means for determining that the index point is aligned with a portion of the first representative image along the axis, means for determining a rendering position based, at least in part, on the portion of the first representative image, means for identifying a frame of the first video segment such that the frame of the first video segment corresponds with the rendering position, and means for causing display of a frame image in the video rendering region, the frame image representing the frame of the first video segment.

In at least one example embodiment, the first video is different from the second video.

In at least one example embodiment, the first video fails to comprise video content that is comprised by the second video.

In at least one example embodiment, the first video comprises video content, and the second video comprises different video content.

In at least one example embodiment, the adjacency of the first video and the second video in the ordered set of separate videos is associated with the first video being chronologically adjacent to the second video.

In at least one example embodiment, the first video is adjacent to the second video in the ordered set of separate videos such that the ordered set of separate videos fails to comprise an intervening video between the first video and the second video.

In at least one example embodiment, a representative image is at least one of a thumbnail image, a gallery image, a cropped image, or a scaled image.

In at least one example embodiment, a representative image is an image that represents at least one of a video or a video segment.

In at least one example embodiment, the first representative image represents, at least a portion of, the first video segment.

In at least one example embodiment, the axis is a vertical axis in relation to an orientation of the display.

In at least one example embodiment, the axis is a horizontal axis in relation to an orientation of the display.

One or more example embodiments further perform receipt of information indicative of an ordered set representation display input, wherein the causation of display of the ordered set representation proximate to the video rendering region of the display is based, at least in part, on the ordered set representation display input.

In at least one example embodiment, the scrub input is an input that indicates a user intent to cause panning of the ordered set representation.

In at least one example embodiment, the scrub input is a drag input.

In at least one example embodiment, the drag input comprises a contact portion of the drag input, a movement portion of the drag input, and a release portion of the drag input.

In at least one example embodiment, the causation of display of the ordered set representation proximate to the video rendering region of the display comprises display of the ordered set representation within a display region of the display that is proximate to the video rendering region of the display, and the contact portion of the drag input is at an input position that corresponds with, at least a portion of, the display region of the display.

In at least one example embodiment, the contact portion of the drag input fails to correspond with the first representative image, the movement portion of the drag input is in relation to the axis, and the release portion of the drag input corresponds with, at least a portion of, the first representative image.

In at least one example embodiment, the index point being aligned with the portion of the first representative image along the axis is indicative of the rendering position within the first video segment.

In at least one example embodiment, the index point being aligned with the portion of the first representative image along the axis is indicative of the frame of the first video segment.

In at least one example embodiment, the index point being aligned with the portion of the first representative image along the axis is indicative of the rendering position within the first video segment.

In at least one example embodiment, the first video comprises video information subsequent to the first video segment, the index point is aligned with an end edge of the first representative image along the axis, and the rendering position corresponds with a final frame of the first video segment.

In at least one example embodiment, the second video is subsequent to the first video in the ordered set of separate videos, and one or more example embodiments further perform identification of a second video segment comprised by the second video that is less than an entirety of the second video, causation of another movement between the ordered set representation and the index point based, at least in part, on the scrub input, determination that the index point is aligned with a portion of the second representative image along the axis, determination of another rendering position based, at least in part, on the portion of the second representative image, identification of a frame of the second video segment such that the frame of the second video segment corresponds with the other rendering position, and causation of display of another frame image in the video rendering region, the other frame image representing the frame of the second video segment.

In at least one example embodiment, the second video comprises video information prior to the second video segment, the index point is aligned with a start edge of the second representative image along the axis, and the rendering position corresponds with a start frame of the second video segment.

In at least one example embodiment, the second representative image represents, at least a portion of, the second video segment.

In at least one example embodiment, the causation of movement between the ordered set representation and the index point comprises panning of the ordered set representation such that the index point fails to move.

In at least one example embodiment, the causation of display of the ordered set representation comprises display of a portion of the ordered set representation and panning of the ordered set representation comprises determination of a different ordered set representation and display of the different ordered set representation.

In at least one example embodiment, the causation of movement between the ordered set representation and the index point comprises panning of the index point such that the ordered set representation fails to move.

In at least one example embodiment, the ordered set of separate videos is ordered based, at least in part, on at least one of chronology, subject matter, or location.

In at least one example embodiment, the identification of the first video segment is based, at least in part, on at least one of peak motion detection within the first video, slow motion playback history of the first video, or a midpoint of the first video.

One or more example embodiments further perform causation of storage of the first video segment as a predetermined video segment, and establishment of an association between the first video and the first video segment.

In at least one example embodiment, the identification of the first video segment comprises determination that a predetermined video segment is associated with the first video, and determination of the first video segment to be the predetermined video segment.

One or more example embodiments further perform receipt of information indicative of a selection input associated with the first representative image, and causation of rendering of the entirety of the first video in the video rendering region based, at least in part, on the selection input.

One or more example embodiments further perform causation of termination of display of the ordered set representation based, at least in part, on the selection input.

In at least one example embodiment, the rendering of the entirety of the first video in the video rendering region comprises rendering of at least a portion of the first video that is beyond the first video segment.

In at least one example embodiment, the rendering of the entirety of the first video in the video rendering region comprises rendering of at least a frame that is comprised by the first video at a position that is at least one or before a start frame of the first video segment or after an end frame of the first video segment.

In at least one example embodiment, the determination that the index point is aligned with the portion of the first representative image along the axis comprises identifying the portion of the first representative image to correspond with a demarcation between the axis and the index point such that the demarcation is orthogonal to the axis.

In at least one example embodiment, the determination of the rendering position is based, at least in part, on the demarcation.

In at least one example embodiment, the rendering position is proportional to a distance between a start edge of the first representative image and the demarcation.

In at least one example embodiment, the rendering position designates a part of the first video to be rendered.

In at least one example embodiment, the rendering position designates a timestamp of the first video, such that identification of the frame of the first video segment comprises determination that the timestamp corresponds with the frame of the first video segment.

One or more example embodiments further perform changing of the first representative image to be a changed first representative image that corresponds with the frame image.

One or more example embodiments further perform causation of display of the changed first representative image, such that the changed first representative image replaces the first representative image.

One or more example embodiments further perform causation of termination of display of the first representative image based, at least in part, on the causation of display of the changed first representative image.

One or more example embodiments further perform causation of termination of display of the first representative image based, at least in part, on the changing of the first representative image to be the changed first representative image that corresponds with the frame image.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
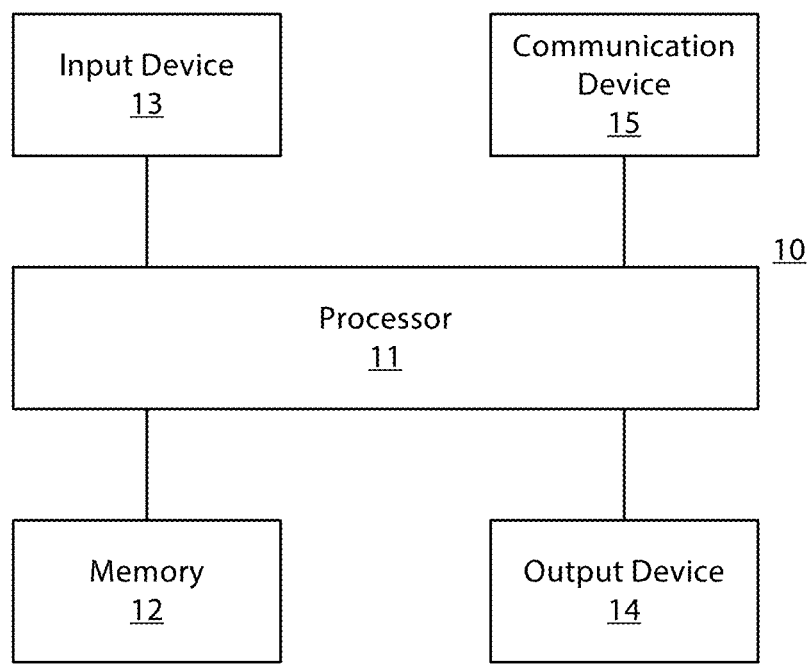
FIG. 1 is a block diagram showing an apparatus according to at least one example embodiment.

An embodiment of the invention and its potential advantages are understood by referring to FIGS. 1 through 8 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
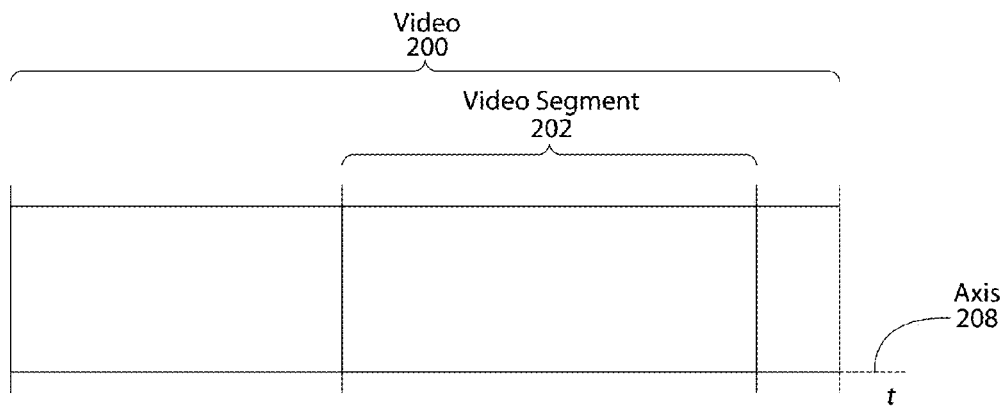
FIGS. 2A-2B are diagrams illustrating a video and a video segment according to at least one example embodiment.
Figure 2B:
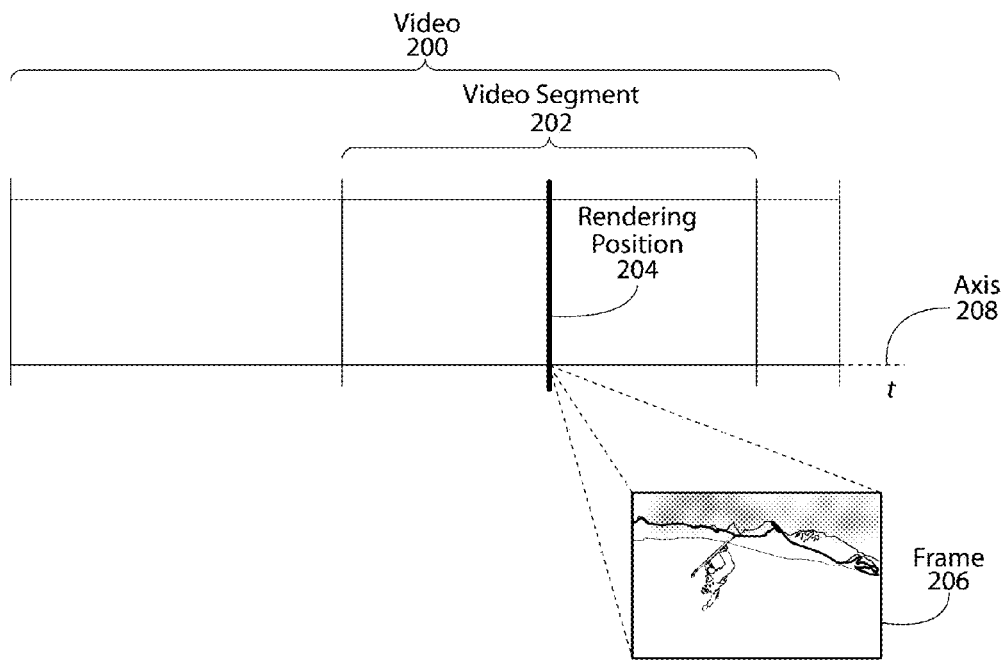

FIGS. 2A-2B are diagrams illustrating a video and a video segment according to at least one example embodiment. The examples of FIGS. 2A-2B are merely examples and do not limit the scope of the claims. For example, video configuration may vary, video segment configuration may vary, rendering position may vary, and/or the like.

In many circumstances, a user of an electronic apparatus may desire to utilize her electronic apparatus in numerous and varied manners. In recent times, users have increasingly utilized their electronic apparatuses for purposes relating to sharing of content with other users, viewing content shared by other users, capturing visual content for later viewing, and/or the like. For example, the user may desire to watch a video. A video may be a movie, a video clip, a motion image, an animated image, and/or the like. For example, the video may be comprised by a particular video file type, such as an audio video interleave file, an MPEG-4 video file, a MPEG video file, a windows media video file, and/or the like.

In such circumstances, the user of the electronic apparatus may desire to view more than one video. For example, the user may desire to watch a slideshow of videos associated with a particular event, may desire to view several related videos, and/or the like. As such, it may be desirable to configure an electronic apparatus such that a user of the electronic apparatus may view a plurality of videos in an easy and intuitive manner. In at least one example embodiment, an apparatus determines an ordered set of separate videos. In such an example embodiment, the ordered set of separate videos may comprise a first video and a second video such that the first video in the ordered set of separate videos is adjacent to the second video in the ordered set of separate videos.

In many circumstances, the user of the apparatus may desire to view the videos in a particular order or grouped into specific groupings. For example, the user may desire to view videos in chronological order, to watch videos that were captured at a particular location, and/or the like. In at least one example embodiment, the ordered set of separate videos is ordered based, at least in part, on chronology, subject matter, location, and/or the like. In this manner, the adjacency of the first video and the second video in the ordered set of separate videos may be associated with the first video being chronologically adjacent to the second video. In at least one example embodiment, the first video is adjacent to the second video in the ordered set of separate videos such that the ordered set of separate videos fails to comprise an intervening video between the first video and the second video. In this manner, the adjacency of the first video and the second video may indicate a chronological adjacency between a capture time of the first video and a capture time of the second video. In at least one example embodiment, the first video and the second video are separate videos. In such an example embodiment, the first video and the second video being separate videos may indicate that the first video is different from the second video, that the first video fails to comprise video content that is comprised by the second video, that the first video comprises video content and the second video comprises different video content, that the first video lacks continuity with the second video, and/or the like. In at least one example embodiment, the first video is associated with a video file, and the second video is associated with a different video file. In this manner, the first video and the second video may be comprised by distinct video files.

In many circumstances, a video may comprise less exciting portions, more exciting portions, and/or the like. In such circumstances, a user may desire to view the portion of the video that is more exciting, and to avoid viewing a portion of the video that is less exciting. In this manner, the user may desire to watch a portion of the video that is less than the entirety of the video in order to facilitate an exciting and interesting viewing experience for the user. Additionally, for example, a user may desire to quickly and intuitively browse for and/or located a specific video, a particular video segment, and/or the like. In such an example, the user may desire to avoid browsing through videos, video segments, and/or the like. Such browsing may be ineffective, inefficient, and frustrating. As such, it may be desirable to configure an apparatus such that the apparatus may identify a particular portion of a video to display to the user. In at least one example embodiment, an apparatus identifies a video segment comprised by a video that is less than an entirety of the video. In order to facilitate an exciting an interesting viewing experience, the identification of the video segment may be based, at least in part, on motion information, color information, subject matter information, and/or the like. There are currently many manners in which an apparatus may identify a video segment of a video, and many more manners will likely be developed in the future. As such, the manner in which the apparatus identifies the video segment of the video does not necessarily limit the claims. For example, the identification of the video segment may be based, at least in part, on peak motion detection within the first video, slow motion playback history of the first video, a midpoint of the first video, and/or the like. In such an example, the user may desire to view a video segment that is associated with activity within the video, as indicated by the motion information. Identification of the video segment based, at least in part, on the midpoint of the video may comprise identification of the midpoint of the video, and identification of a video segment of the video such that the video segment comprises the midpoint of the video. For example, the video segment may be associated with a duration that spans 15 seconds prior to the midpoint of the video and 15 seconds subsequent to the midpoint of the video, 10 seconds prior to the midpoint of the video and 30 seconds subsequent to the midpoint of the video, and/or the like. In this manner, the video segment may be identified based, at least in part, on an assumption that the middle portion of a video is more interesting than the remainder of the video.

Once a particular video segment of a video has been identified, it may be desirable for an electronic apparatus to cause storage of an indication of the video segment, of the video segment, and/or the like, such that a user of the electronic apparatus may subsequently watch the video segment. In at least one example embodiment, an apparatus causes storage of the video segment as a predetermined video segment. For example, the apparatus may cause storage of the video segment in a predetermined video segment repository, may store information indicative of the video segment in a database, and/or the like. In such an example, causation of storage of the video segment may comprise storage of the video segment in at least one memory comprised by the apparatus, sending of the video segment to a separate apparatus such that the separate apparatus stores the video segment, and/or the like.

In order to maintain a relational connection between the video and the video segment of the video, it may be desirable to establish an association between the video and the video segment. For example, information indicative of the association between the video and the video segment may be stored in a data base, in metadata associated with the video, in metadata associated with the video segment, and/or the like. In this manner, the apparatus may establish a relation association between the video and the video segment. For example, the identification of the video segment may comprise determination that a predetermined video segment is associated with the video. In such an example, the apparatus may retrieve information indicative of an association between the video and a particular video segment. In such an example, the apparatus may determine the video segment to be the predetermined video segment based, at least in part, on the information indicative of the association between the video and the predetermined video segment.

FIG. 2A is a diagram illustrating a video and a video segment according to at least one example embodiment. The example of FIG. 2A depicts video 200 in relation to axis 208. In the example of FIG. 2A, axis 208 is a temporal axis. In this manner, the width of video 200 on axis 208 is indicative of a duration of video 200. As can be seen in the example of FIG. 2A, video 200 comprises video segment 202, which is also depicted in relation to axis 208. Video segment 202 is a portion of video 200 that is less than the entirety of video 200. As can be seen, the duration of video segment 202, as indicated by the width of video segment 202 on axis 208, is less than the duration of video 200. As such, video segment 202 is a portion of video 200 that is less than the entirety of video 200. Video segment 202 may have been identified based, at least in part, on retrieval of information indicative of a predetermined video segment of video 200, peak motion detection within video 200, slow motion playback history of video 200, a midpoint of video 200, and/or the like.

As discussed previously, in many circumstances, a user of an electronic apparatus may desire to watch a video, view a movie, watch a video segment, and/or the like. As such, it may be desirable to configure the electronic apparatus such that the electronic apparatus may render a video, render a video segment, display a video segment, and/or the like. In at least one example embodiment, rendering of a video segment comprises causation of displaying of the video segment on a display. The display may be comprised by the apparatus, by a separate apparatus, and/or the like. In this manner, the apparatus may display the video segment on a display comprised by the apparatus, may send the video segment to a separate apparatus such that the separate apparatus is caused to display the video segment, and/or the like.

In order to facilitate rendering of a video segment, displaying of the video segment, etc., it may be desirable to identify a particular rendering position associated with playback of the video segment. In at least one example embodiment, an apparatus identifies a frame of a video segment such that the frame of the video segment corresponds with a rendering position. The rendering position may designate a part of a video to be rendered, a part of a video segment to be rendered, and/or the like. For example, the rendering position may designate a timestamp of the video, such that identification of the frame of the video segment comprises determination that the timestamp corresponds with the frame of the video segment. In this manner, the rendering position may be indicative of a particular timestamp of the video, a particular frame of the video, and/or the like. In at least one example embodiment, a frame of the video segment is represented by a frame image. For example, the frame image may be a downscaled version of the frame, an upscaled version of the frame, may be an interlaced version of the frame, and/or the like. In such an example, the apparatus may cause display of the frame image in a video rendering region. The video rendering region may be a portion of a display associated with rendering of a video, a video segment, a frame image, a frame, and/or the like.

FIG. 2B is a diagram illustrating a video, a video segment, and a rendering position according to at least one example embodiment. As can be seen, video 200, video segment 202, and axis 208 of FIG. 2B correspond with video 200, video segment 202, and axis 208 of FIG. 2A. The example of FIG. 2B illustrates rendering position 204 in relation to video segment 202 and axis 208. In the example of FIG. 2B, rendering position 204 designates a timestamp of video 200 and/or video segment 202, as indicated by the position of rendering position 204 on axis 208. As can be seen, rendering position 204 is associated with frame 206, which is comprised by video 200 and/or video segment 202. In this manner, frame 206 is located at the timestamp designated by rendering position 204.

Figure 3A:
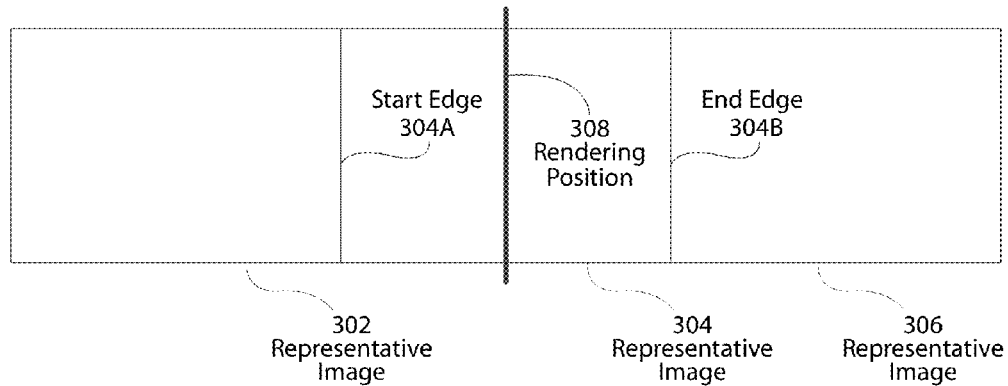
FIGS. 3A-3B are diagrams illustrating an ordered set representation and representative images according to at least one example embodiment.
Figure 3B:
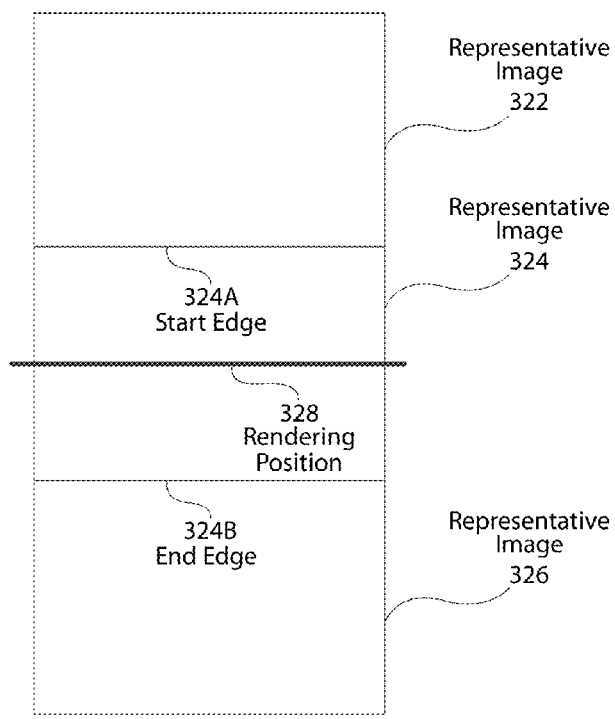

FIGS. 3A-3B are diagrams illustrating an ordered set representation and representative images according to at least one example embodiment. The examples of FIGS. 3A-3B are merely examples and do not limit the scope of the claims. For example, representative image configuration may vary, representative image count may vary, representative image arrangement may vary, start edge and/or end edge configuration may vary, rendering position may vary, index point configuration and/or design may vary, and/or the like.

As discussed previously, in many circumstances, a user may desire to view more than one video, video segment, and/or the like, by way of an ordered set of separate videos. In such circumstances, the user may desire to perceive information indicative of the video segment that is currently being rendered, another video segment that was previously rendered, a different video segment that may be rendered subsequent to the video segment that is currently being rendered, and/or the like. In this manner, the user may desire to be able to identify videos and/or video segments that may be comprised by the ordered set of separate videos. In at least one example embodiment, an apparatus determines an ordered set representation that indicates the ordered set of separate videos. In such an example embodiment, the ordered set representation may comprise a first representative image that represents, at least a portion of, the first video and a second representative image that represents, at least portion of, the second video. In such an example embodiment, the first representative image and the second representative image may be arranged along an axis in accordance with an ordering of the ordered set of separate videos. A representative image may be an image that represents a video and/or a video segment, indicates a particular video and/or video segment, identifies a particular video, identifies a particular video segment, and/or the like. For example, the representative image may be a thumbnail image, a gallery image, a cropped image, a scaled image, and/or the like that represents the video, the video segment, and/or the like. For example, the representative image may be based, at least in part, on a frame comprised by the video, a frame image associated with a frame that is comprised by the video segment, and/or the like.

In order to facilitate a user in identification of ordering of the videos within the ordered set of separate videos by way of the ordered set representation, it may be desirable to display the representative images in relation to a specific axis. For example, the axis may, at least partially, be associated with a chronological characteristic of the ordered set of separate videos, a locational aspect of the ordered set of separate videos, and/or the like. The axis may be a vertical axis in relation to an orientation of a display, a horizontal axis in relation to the orientation of the display, and/or the like. In this manner, the representative images may be arranged side by side in relation to a horizontal axis, one on top of another in relation to a vertical axis, and/or the like.

FIG. 3A is a diagram illustrating an ordered set representation and representative images according to at least one example embodiment. The example of FIG. 3A depicts representative image 302, representative image 304, and representative image 306 displayed in relation to a horizontal axis. As can be seen, the representative images are arranged such that the representative images are side by side in relation to the horizontal axis. In this manner, the right side of representative image 302 is adjacent to the left side of representative image 304, and the right side of representative image 304 is adjacent to the left side of representative image 306. As depicted in the example of FIG. 3A, representative image 304 is bounded by start edge 304A and end edge 304B. In this example of FIG. 3A, start edge 304A is at a position that corresponds with a start frame of the video segment represented by representative image 304, and end edge 304B is at a position that corresponds with an end frame of the video segment represented by representative image 304. In this manner, the span of representative image 304 between start edge 304A and end edge 304B along the horizontal axis may be, at least partially, indicative of a duration of the video segment represented by representative image 304. As can be seen, rendering position 308 is at a position along the horizontal axis that corresponds with a portion of representative image 304. In this manner, rendering position 308 may designative a particular timestamp within the video segment represented by representative image 304, a particular frame within the video segment represented by representative image 304, and/or the like.

FIG. 3B is a diagram illustrating an ordered set representation and representative images according to at least one example embodiment. The example of FIG. 3B depicts representative image 322, representative image 324, and representative image 326 displayed in relation to a vertical axis. As can be seen, the representative images are arranged such that the representative images are one on top of another in relation to the vertical axis. In this manner, the bottom of representative image 322 is adjacent to the top of representative image 324, and the bottom of representative image 324 is adjacent to the top of representative image 326. As depicted in the example of FIG. 3B, representative image 324 is bounded by start edge 324A and end edge 324B. In this example of FIG. 3B, start edge 324A is at a position that corresponds with a start frame of the video segment represented by representative image 324, and end edge 324B is at a position that corresponds with an end frame of the video segment represented by representative image 324. In this manner, the span of representative image 324 between start edge 324A and end edge 324B along the vertical axis may be, at least partially, indicative of a duration of the video segment represented by representative image 324. As can be seen, rendering position 328 is at a position along the vertical axis that corresponds with a portion of representative image 324. In this manner, rendering position 328 may designative a particular timestamp within the video segment represented by representative image 324, a particular frame within the video segment represented by representative image 324, and/or the like.

FIGS. 4A-4D are diagrams illustrating an ordered set representation proximate to a video rendering region according to at least one example embodiment. The examples of FIGS. 4A-4D are merely examples and do not limit the scope of the claims. For example, apparatus configuration may vary, video rendering region configuration and/or design may vary, ordered set representation configuration and/or design may vary, video and/or video segment content may vary, frame image may vary, representative images may vary, and/or the like.

As discussed previously, in many circumstances, it may be desirable to configure an apparatus such that a user of the apparatus may identify one or more videos and/or video segments associated with an ordered set of separate videos by way of an ordered set representation. In such circumstances, a user of the apparatus may desire to browse through the videos and/or the video segments associated with the ordered set of separate videos, cause rendering of one or more videos and/or the video segments associated with the ordered set of separate videos, and/or the like, by way of the ordered set representation. As such, it may be desirable to display the ordered set representation at a position on a display that is proximate to a display region associated with a video rendering region of the display. In at least one example embodiment, an apparatus causes display of at least part of an ordered set representation proximate to a video rendering region of a display. In some circumstances, an ordered set representation may comprise more representative images than may be displayed in a single row across a display. As such, in some circumstances, the ordered set representation may pan off of the screen such that only a part of the ordered set representation is visible. In this manner, the apparatus may cause display of a part of the ordered set representation and, as playback of the video segments progresses, cause display of a different part of the ordered set representation. As such, the ordered set of separate videos and the associated ordered set representation may not be bound my display configuration restraints. In at least one example embodiment, the ordered set representation is displayed as an overlay such that the ordered set representation at least partially overlaps the video rendering region of the display.

Figure 4A:
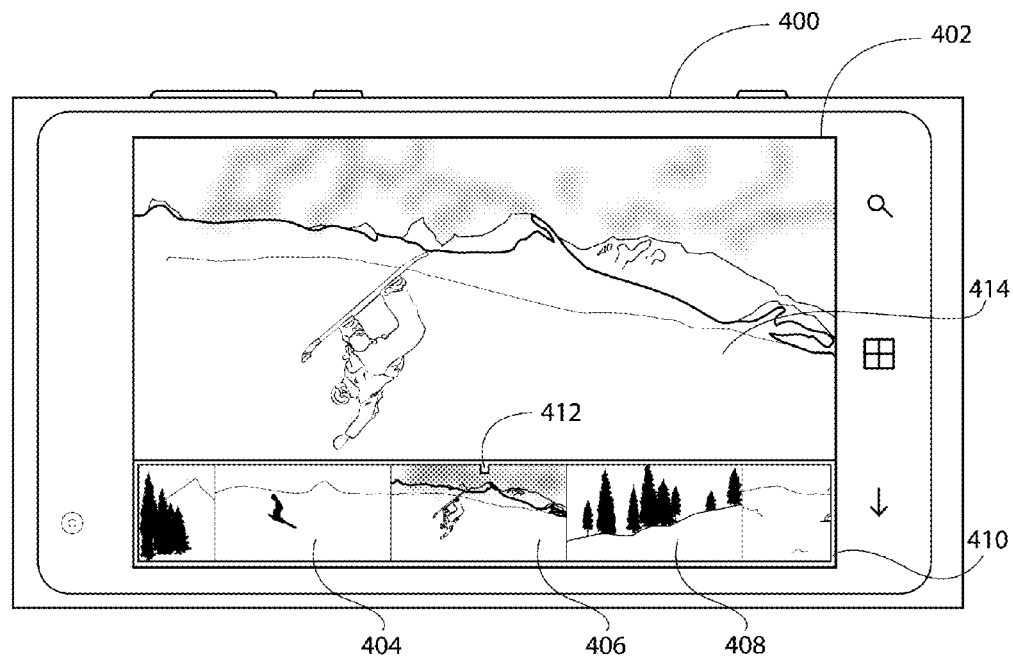
FIGS. 4A-4D are diagrams illustrating an ordered set representation proximate to a video rendering region according to at least one example embodiment.

FIG. 4A is a diagram illustrating an ordered set representation proximate to a video rendering region according to at least one example embodiment. The example of FIG. 4A depicts apparatus 400, which comprises display 402. In the example of FIG. 4A, apparatus 400 is displaying ordered set representation 410 and frame image 414. In the example of FIG. 4A, ordered set representation 410 comprises representative image 404, representative image 406, and representative image 408. In the example of FIG. 4A, frame image 414 is displayed within a video rendering region of display 402. As can be seen, ordered set representation 410 is displayed as an overlay with respect to frame image 414, the video rendering region, etc.

Figure 4B:
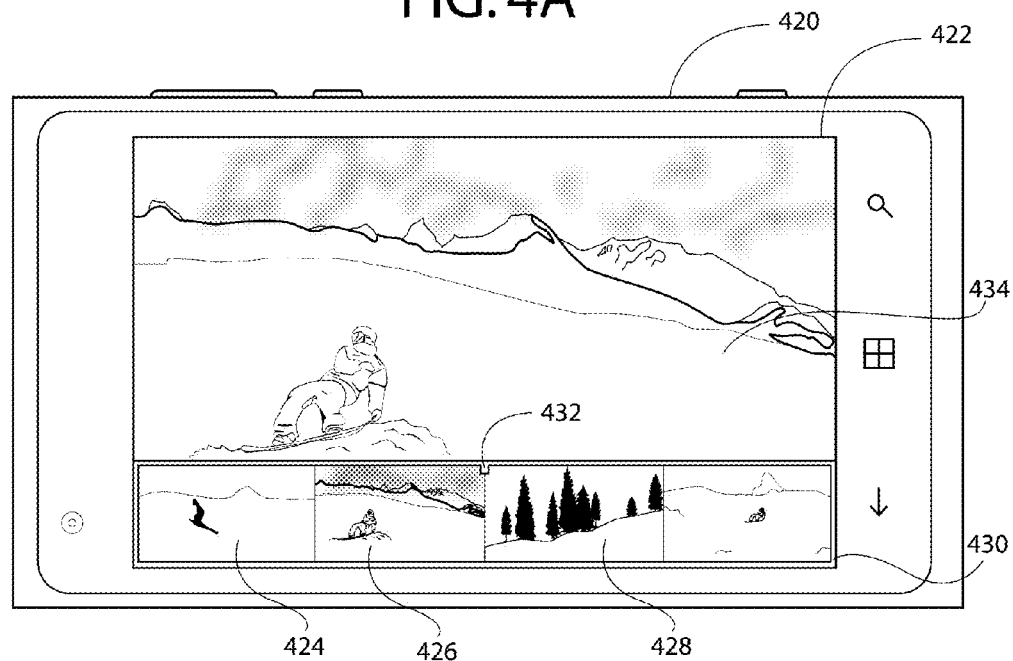

FIG. 4B is a diagram illustrating an ordered set representation proximate to a video rendering region according to at least one example embodiment. The example of FIG. 4B depicts apparatus 420, which comprises display 422. In the example of FIG. 4B, apparatus 420 is displaying ordered set representation 430 and frame image 434. In the example of FIG. 4B, ordered set representation 430 comprises representative image 424, representative image 426, and representative image 428. In the example of FIG. 4B, frame image 434 is displayed within a video rendering region of display 422. As can be seen, ordered set representation 430 is displayed as an overlay with respect to frame image 434, the video rendering region, etc.

In some circumstances, a user may desire to avoid overlapping of the video rendering region by the ordered set representation, to view the entirety of the video rendering region, and/or the like. In such circumstances, it may be desirable to configure an apparatus such that a user of the apparatus may indicate the user's desire to terminate display of the ordered set representation. In at least one example embodiment, an apparatus receives information indicative of an ordered set representation hide input. In such an example embodiment, the apparatus may cause termination of display of the ordered set representation based, at least in part, on the ordered set representation hide input. Similarly, in many circumstances, a user of an apparatus may desire to perceive an ordered set representation when no ordered set representation is currently being displayed. In such circumstances, it may be desirable to configure an apparatus such that a user of the apparatus may indicate the user's desire to cause display of the ordered set representation. In at least one example embodiment, an apparatus receives information indicative of an ordered set representation display input. In such an example embodiment, the apparatus may cause display of the ordered set representation proximate to the video rendering region of the display based, at least in part, on the ordered set representation display input.

As discussed previously, in many circumstances, a user may desire to fast forward through a portion of a video segment, to jump back to a particular timestamp associated with a different video segment, and/or the like. In at least one example embodiment, an input that indicates a user intent to cause panning of the ordered set representation, to jump to a particular timestamp associated with a specific video segment, and/or the like, is a scrub input. In at least one example embodiment, an apparatus receives information indicative a scrub input associated with the ordered set representation. In at least one example embodiment, a scrub input is a drag input. In such an example embodiment, the drag input may comprise a contact portion of the drag input, a movement portion of the drag input, and a release portion of the drag input. For example, the causation of display of the ordered set representation proximate to the video rendering region of the display may comprise display of the ordered set representation within a display region of the display that is proximate to the video rendering region of the display. In such an example, the contact portion of the drag input may be at an input position that corresponds with, at least a portion of, the display region of the display. In this manner, the contact portion of the drag input that is at an input position that corresponds with, at least a portion of, the display region of the display is indicative of a scrub input associated with the ordered set representation.

For example, a user may desire to indicate a rendering position by way of a scrub input associated with an ordered set representation. In such an example, the user may desire to indicate a rendering position associated with a particular video segment that is represented by a representative image. As such, the user may indicate such a desire by way of a drag input that scrubs to the rendering position in relation to the axis and the representative image. For example, the drag input may comprise a contact portion of the drag input that fails to correspond with the first representative image, a movement portion of the drag input that moves in relation to the axis, and a release portion of the drag input corresponds with, at least a portion of, the representative image. In such an example, the contact portion of the drag input and the movement portion of the drag input may indicate scrubbing to a rendering position that is associated with a position of the release portion of the drag input. In this manner, the release portion of the drag input corresponding with, at least a portion of, the representative image that represents the particular video segment may be indicative of the user's desire to cause playback of the video segment from the timestamp designated by the rendering position.

In order to facilitate identification of a particular rendering position and to allow a user to accurately scrub through an ordered set of separate videos by way of an associated ordered set representation, it may be desirable to display an indication of a current position, of a selected rendering position, of a playback position, and/or the like. In at least one example embodiment, an apparatus causes display of an index point in relation to the ordered set representation. In such an example embodiment, the index point indicates a current position, a displayed frame, a selected rendering position, a playback position, and/or the like by way of the ordered set representation. In at least one example embodiment, an apparatus causes movement between the ordered set representation and an index point based, at least in part, on the scrub input. In at least one example embodiment, causation of movement between the ordered set representation and the index point comprises panning of the ordered set representation such that the index point fails to move. In this manner, the index point may remain stationary at a position on a display, and the ordered set representation may be caused to move in relation to the index point. For example, causation of display of the ordered set representation may comprise display of a portion of the ordered set representation, and panning of the ordered set representation may comprise determination of a different ordered set representation and display of the different ordered set representation. In at least one example embodiment, causation of movement between the ordered set representation and the index point comprises panning of the index point such that the ordered set representation fails to move. For example, the display position of the index point may be moved based, at least in part, on a scrub input such that the index point is dynamically displayed at a display position that corresponds with the scrub input.

For example, as depicted in the example of FIG. 4A, index point 412 is at a position that corresponds with representative image 406. As can be seen, index 412 is at a position that is approximately in the middle of representative image 406, which is indicative of a rendering position that designates a timestamp that is approximately in the middle of the video segment represented by representative image 406. In some circumstances, a user may desire to scrub to a different rendering position, such as to the end of the video segment represented by representative image 406, the beginning of the video segment represented by representative image 408, and/or the like. As can be seen in the example of FIG. 4B, index point 432 is at a position that is at the end edge of representative image 426, which is indicative of a rendering position that designates a timestamp that is approximately at the end of the video segment represented by representative image 426. In this matter, FIG. 4B may represent the example of FIG. 4A subsequent to receipt of a scrub input that caused movement of ordered set representative 410 of FIG. 4A in relation to index point 412 of FIG. 4A.

In such circumstances, the apparatus may determine that the index point is aligned with a portion of a representative image along the axis. For example, the index point being aligned with the portion of the representative image along the axis may be indicative of the rendering position being a position that is within the video segment, the rendering position designating a particular frame of the video segment, the rendering position designating a particular timestamp associated with the video segment, and/or the like. In at least one example embodiment, the determination that the index point is aligned with the portion of the representative image along the axis comprises identification of the portion of the representative image to correspond with a demarcation between the axis and the index point such that the demarcation is orthogonal to the axis. In this manner, if the axis is a horizontal axis, the demarcation is vertically orthogonal to the horizontal axis, and if the axis is a vertical axis, the demarcation is horizontally orthogonal to the vertical axis.

As discussed previously, in many circumstances, a user may desire to indicate a particular rendering position based, at least in part, on a scrub input that causes movement between an index point and an ordered set representation. In such circumstances, the user may indicate the particular rendering position by dragging the ordered set representation to a position such that the index point becomes aligned with a particular portion of the representative image that represents the video segment that the user desires to have rendered. In this manner, the determination of a rendering position may be based, at least in part, on the portion of the representative image, the demarcation, and/or the like. In at least one example embodiment, the rendering position is proportional to a distance between a start edge of a representative image and the demarcation, between an end edge of the representative image and the demarcation, and/or the like. For example, as depicted in the example of FIG. 4A, index point 412 is at a position that is approximately in the middle of representative image 406. In this manner, the index point is indicative of a rendering position that is approximately in the middle of the video segment that is represented by representative image 406. Similarly, as depicted in the example of FIG. 4B, index point 432 is at a position that is approximately at the end edge of representative image 426. In this manner, the index point is indicative of a rendering position that is approximately at the end of the video segment that is represented by representative image 426.

In order to facilitate rendering of a video segment represented by the representative image, it may be desirable to identify a specific frame of the video segment to render. In at least one example embodiment, an apparatus identifies a frame of the video segment such that the frame of the video segment corresponds with the rendering position. In such an example embodiment, the apparatus causes display of a frame image in the video rendering region, similar as may be described regarding FIGS. 2A-2B.

As discussed previously, in many circumstances, a user may desire to view more than one video comprised by an ordered set of separate videos. For example, the ordered set of separate videos may comprise a first video and a second video. In such an example, the first video may comprise video information subsequent to the first video segment, and the index point may be aligned with an end edge of the first representative image along the axis such that the rendering position corresponds with a final frame of the first video segment. In such an example, continued playback from this rendering position associated with the final frame of the video segment represented by the first representative image may cause rendering of a different video segment that is represented by the second representative image.

In many circumstances, a user may desire to adjust a rendering position such that the rendering position is moved from a position that is associated with a first representative image to a position that is associated with a second representative image. In this manner, the user may desire to discontinue rendering of a first video that is represented by the first representative image, and to cause rendering of a second video that is represented by the second representative image. For example, the second video may be subsequent to the first video in the ordered set of separate videos. In such an example, the apparatus may identify a second video segment comprised by the second video that is less than an entirety of the second video. The user may indicate the user's desire to scrub to a different position within the second video segment by way of a scrub input. As such, the apparatus may cause a movement between the ordered set representation and the index point based, at least in part, on the scrub input, and determine that the index point is aligned with a portion of the second representative image along the axis. In such an example, the second representative image represents, at least a portion of, the second video segment. Based, at least in part, on the portion of the second representative image that is aligned with the index point, the apparatus may determine another rendering position associated with the second video segment, identify a frame of the second video segment such that the frame of the second video segment corresponds with the other rendering position, and cause display of a frame image in the video rendering region such that the frame image represents the frame of the second video segment.

In some circumstances, a user may desire to view a video in its entirety rather than view a portion of the video, a video segment of the video, and/or the like. For example, the user may desire to view happening that may have been captured prior to the timestamp associated with the beginning of the video segment, subsequent to the timestamp associated with the end of the video segment, and/or the like. As such, it may be desirable to configure an apparatus such that a user of the apparatus may indicate the user's desire to view the entirety of a video. In at least one example embodiment, an apparatus receives information indicative of a selection input associated with a representative image. In such an example embodiment, the apparatus may cause rendering of the entirety of the first video in the video rendering region based, at least in part, on the selection input. Rendering of the entirety of the first video in the video rendering region may comprise rendering of at least a portion of the first video that is beyond the first video segment, rendering of at least a frame that is comprised by the first video at a position that is at least one or before a start frame of the first video segment or after an end frame of the first video segment, and/or the like. As discussed previously, it may be desirable to avoid obstruction of the video rendering region of the display by the ordered set representation. In this manner, it may be desirable to cause termination of display of the ordered set representation. In at least one example embodiment, an apparatus causes termination of display of the ordered set representation based, at least in part, on the selection input.

In order to provide an exciting and informative viewing experience to a user of an apparatus, it may be desirable to dynamically update a representative image based, at least in part, on rendering of a frame of the video segment that is represented by the representative image. In at least one example, an apparatus changes a representative image to be a changed representative image that corresponds with a frame, a frame image, and/or the like. In such an example embodiment, the apparatus may cause display of the changed representative image, such that the changed representative image replaces the representative image, takes the place of the representative image in the ordered set representation, and/or the like. As such, the apparatus may cause termination of display of the representative image based, at least in part, on the causation of display of the changed representative image, on the changing of the representative image to be the changed representative image that corresponds with the frame, the frame image, etc., and/or the like. For example, as depicted in the example of FIG. 4A, representative image 406 corresponds with frame image 414. Similarly, in the example of FIG. 4B, representative image 426 corresponds with frame image 434.

In some circumstances, it may be desirable to emphasize an ordered set representation, deemphasize a video rendering region, and/or the like. For example, it may be desirable to configure an apparatus such that the apparatus causes display of an ordered set representation such that the ordered set representation is displayed in a region of a display that corresponds with a majority of the display, an entirety of the display, and/or the like. In such an example, the apparatus may reduce a display size of the video rendering region, terminate display of the video rendering region, preclude display of the video rendering region, and/or the like. In such an example, the user may perceive and/or view the video segments represented by the ordered set representation by way of the ordered set representation. For example, as discussed previously, a representative image associated with a video segment may be dynamically changed and/or updated such that the representative image corresponds with a specific frame, frame image, etc. In such an example, the representative image may be changed such that the representative image is replaced by a changed representative image that is based, at least in part, on rendering of a frame of the video segment that is represented by the representative image. In such an example, as rendering of the video segment progresses, a user of the apparatus may perceive playback of the video segment by way of the associated representative image that is comprised by the ordered set representation.

In such circumstances, an apparatus may determine an ordered set of separate videos, identify a video segment that is comprised by a video, determine an ordered set representation that indicates the ordered set of separate videos, and cause display of at least part of the ordered set representation. In such an example, a user may indicate a desired rendering position within the video segment by way of a scrub input, such that the apparatus determines a rendering position that is within the video segment. In such an example, the apparatus may cause display of a frame associated with the rendering position by way of changing the associated representative image to correspond with the frame, frame image, etc. associated with the rendering position.

Figure 4C:
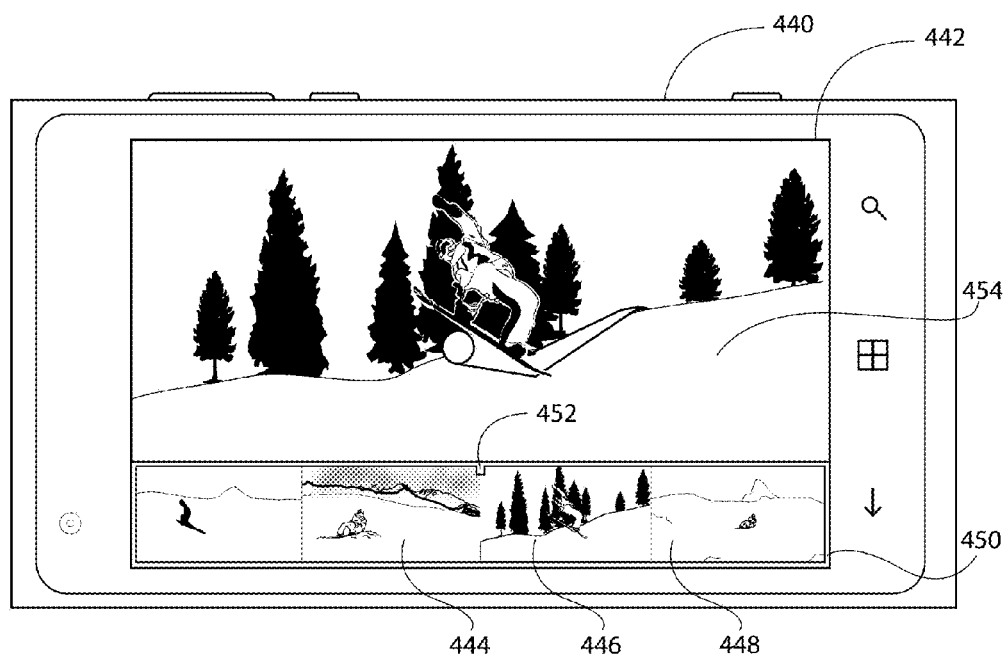

FIG. 4C is a diagram illustrating an ordered set representation proximate to a video rendering region according to at least one example embodiment. The example of FIG. 4C depicts apparatus 440, which comprises display 442. In the example of FIG. 4C, apparatus 440 is displaying ordered set representation 450 and frame image 454. In the example of FIG. 4C, ordered set representation 450 comprises representative image 444, representative image 446, and representative image 448. In the example of FIG. 4C, frame image 454 is displayed within a video rendering region of display 442. As can be seen, ordered set representation 450 is displayed as an overlay with respect to frame image 454, the video rendering region, etc.

Figure 4D:
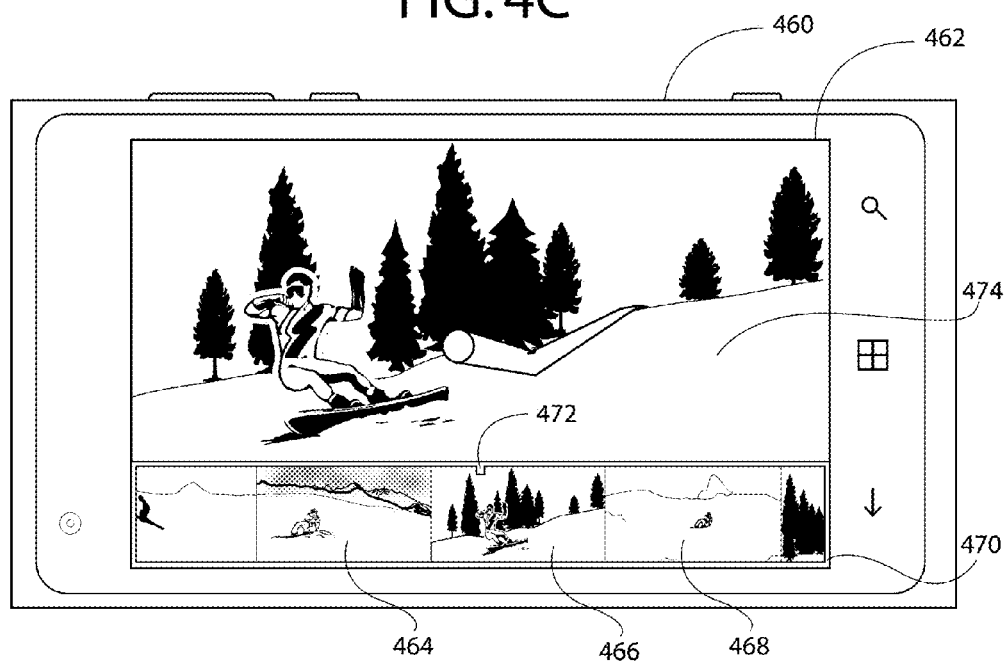

FIG. 4D is a diagram illustrating an ordered set representation proximate to a video rendering region according to at least one example embodiment. The example of FIG. 4D depicts apparatus 460, which comprises display 462. In the example of FIG. 4D, apparatus 460 is displaying ordered set representation 470 and frame image 474. In the example of FIG. 4D, ordered set representation 470 comprises representative image 464, representative image 466, and representative image 468. In the example of FIG. 4D, frame image 474 is displayed within a video rendering region of display 462. As can be seen, ordered set representation 470 is displayed as an overlay with respect to frame image 474, the video rendering region, etc. In the examples of FIG. 4C and FIG. 4D, representative image 446 of FIG. 4C corresponds with representative image 466 of FIG. 4D. As can be seen in the example of FIG. 4C, index point 452 indicates a rendering position at the beginning of the video segment represented by representative image 446, and, in the example of FIG. 4D, index point 472 indicates a rendering position that is within the video segment represented by representative image 466. In this manner, the example of FIG. 4D may represent the example of FIG. 4C subsequent to rendering of the portion of the video segment between the beginning of the video segment and the timestamp designated by the rendering position that is indicated by index point 472 of FIG. 4D.

Figure 5:
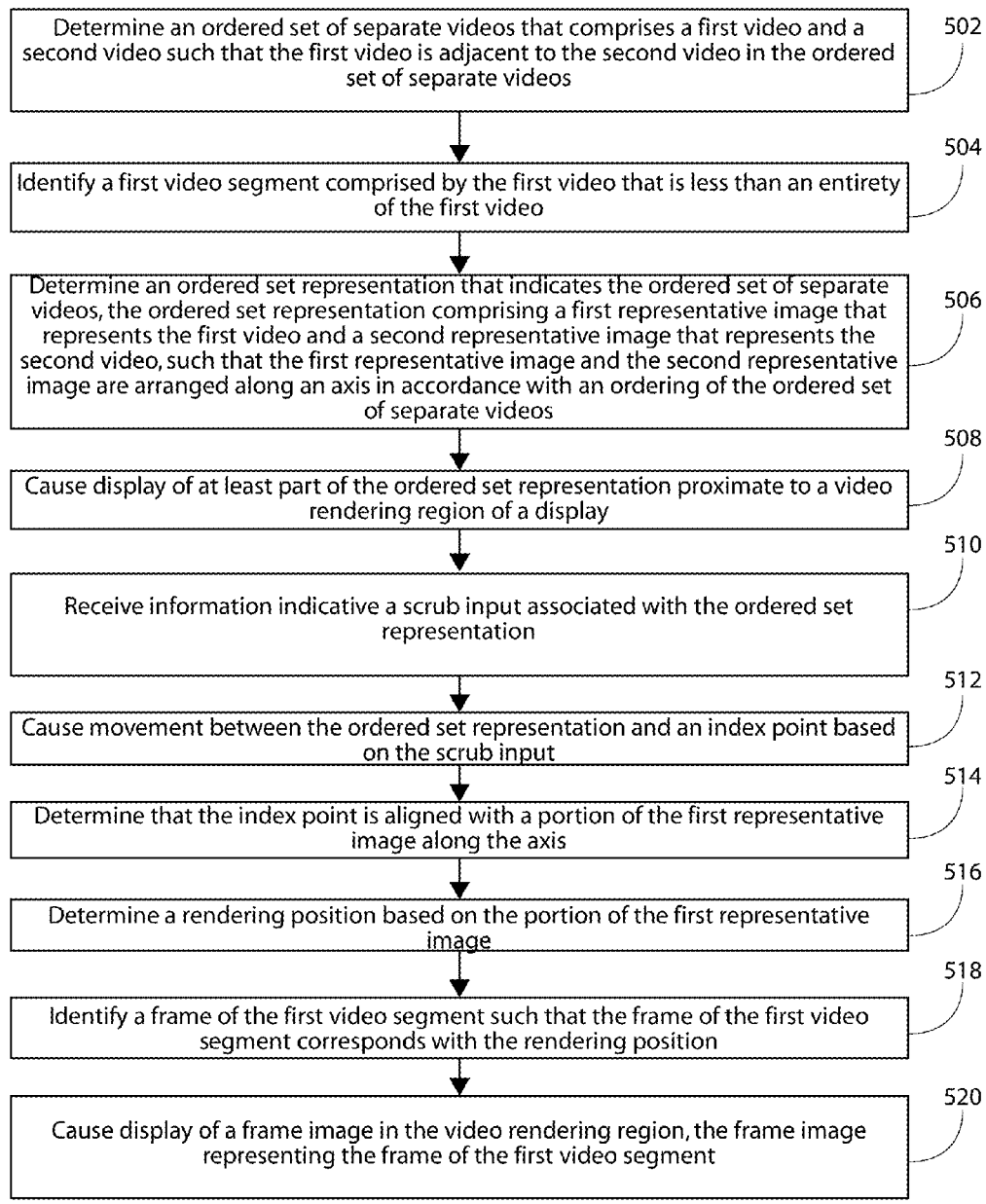
FIG. 5 is a flow diagram illustrating activities associated with causation of display of a frame image in a video rendering region according to at least one example embodiment.

FIG. 5 is a flow diagram illustrating activities associated with causation of display of a frame image in a video rendering region according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

At block 502, the apparatus determines an ordered set of separate videos that comprises a first video and a second video such that the first video is adjacent to the second video in the ordered set of separate videos. The determination, the ordered set of separate videos, the first video, and the second video may be similar as described regarding FIGS. 2A-2B, FIGS. 3A-3B, and FIGS. 4A-4D.

At block 504, the apparatus identifies a first video segment comprised by the first video that is less than an entirety of the first video. The identification and the first video segment may be similar as described regarding FIGS. 2A-2B, FIGS. 3A-3B, and FIGS. 4A-4D.

At block 506, the apparatus determines an ordered set representation that indicates the ordered set of separate videos. In at least one example embodiment, the ordered set representation comprises a first representative image that represents, at least a portion of, the first video and a second representative image that represents, at least part of, the second video, such that the first representative image and the second representative image are arranged along an axis in accordance with an ordering of the ordered set of separate videos. The determination, the ordered set representation, the first representative image, the second representative image, and the axis may be similar as described regarding FIGS. 2A-2B, FIGS. 3A-3B, and FIGS. 4A-4D.

At block 508, the apparatus causes display of at least part of the ordered set representation proximate to a video rendering region of a display. The causation of display, the part of the ordered set presentation, the video rendering region, and the display may be similar as described regarding FIGS. 2A-2B, FIGS. 3A-3B, and FIGS. 4A-4D.

At block 510, the apparatus receives information indicative a scrub input associated with the ordered set representation. The receipt and the scrub input may be similar as described regarding FIGS. 3A-3B and FIGS. 4A-4D.

At block 512, the apparatus causes movement between the ordered set representation and an index point based, at least in part, on the scrub input. The causation of movement and the index point may be similar as described regarding FIGS. 2A-2B, FIGS. 3A-3B, and FIGS. 4A-4D.

At block 514, the apparatus determines that the index point is aligned with a portion of the first representative image along the axis. The determination and the portion of the first representative image may be similar as described regarding FIGS. 2A-2B, FIGS. 3A-3B, and FIGS. 4A-4D.

At block 516, the apparatus determines a rendering position based, at least in part, on the portion of the first representative image. The determination and the rendering position may be similar as described regarding FIGS. 2A-2B, FIGS. 3A-3B, and FIGS. 4A-4D.

At block 518, the apparatus identifies a frame of the first video segment such that the frame of the first video segment corresponds with the rendering position. The identification and the frame of the first video segment may be similar as described regarding FIGS. 2A-2B, FIGS. 3A-3B, and FIGS. 4A-4D.

At block 520, the apparatus causes display of a frame image in the video rendering region, the frame image representing the frame of the first video segment. The causation of display and the frame image may be similar as described regarding FIGS. 2A-2B, FIGS. 3A-3B, and FIGS. 4A-4D.

Figures 1, 6:
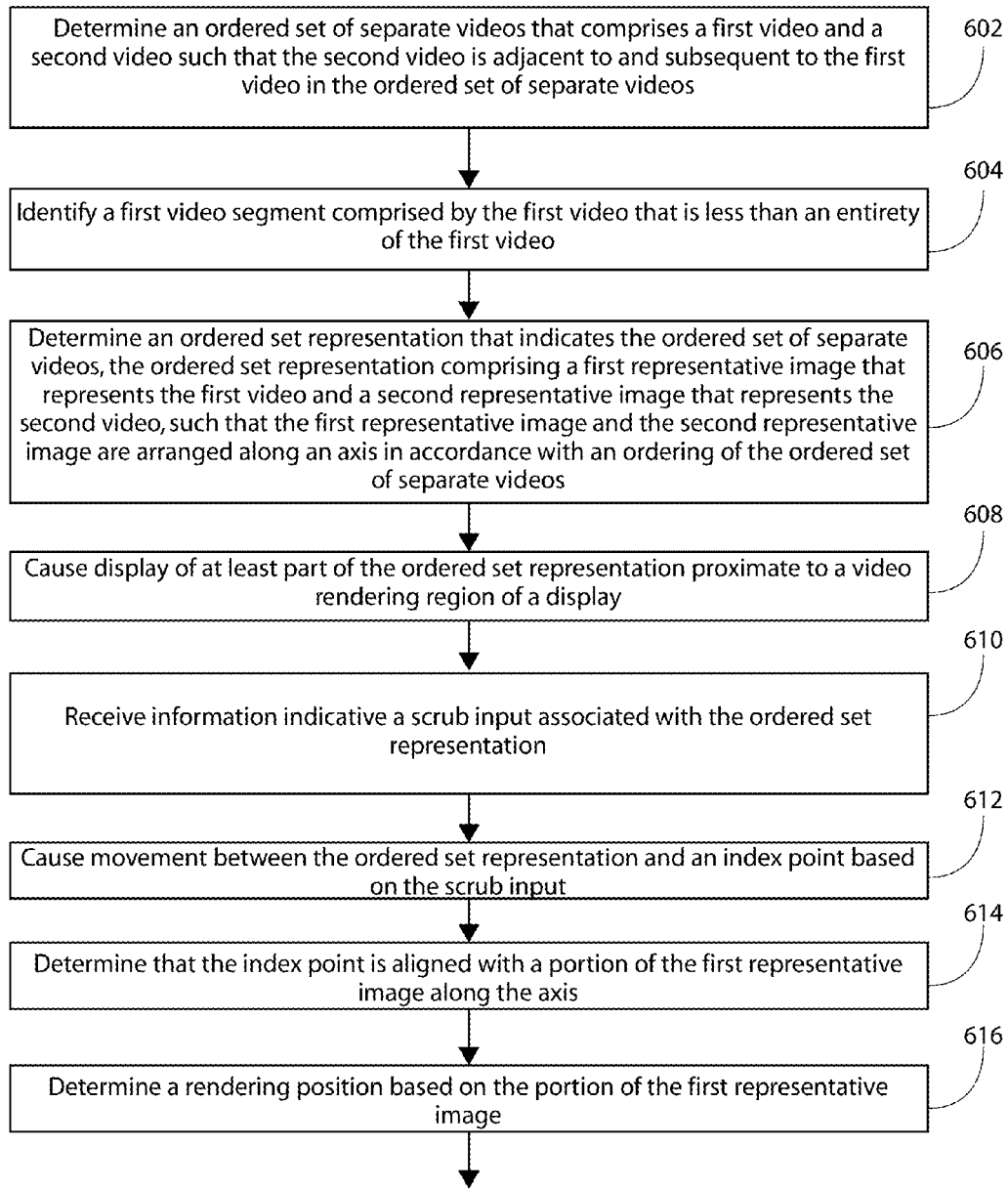
FIG. 6, included as FIG. 6-1 and FIG. 6-2, is a flow diagram illustrating activities associated with causation of display of a frame image in a video rendering region according to at least one example embodiment.
Figures 2, 6:
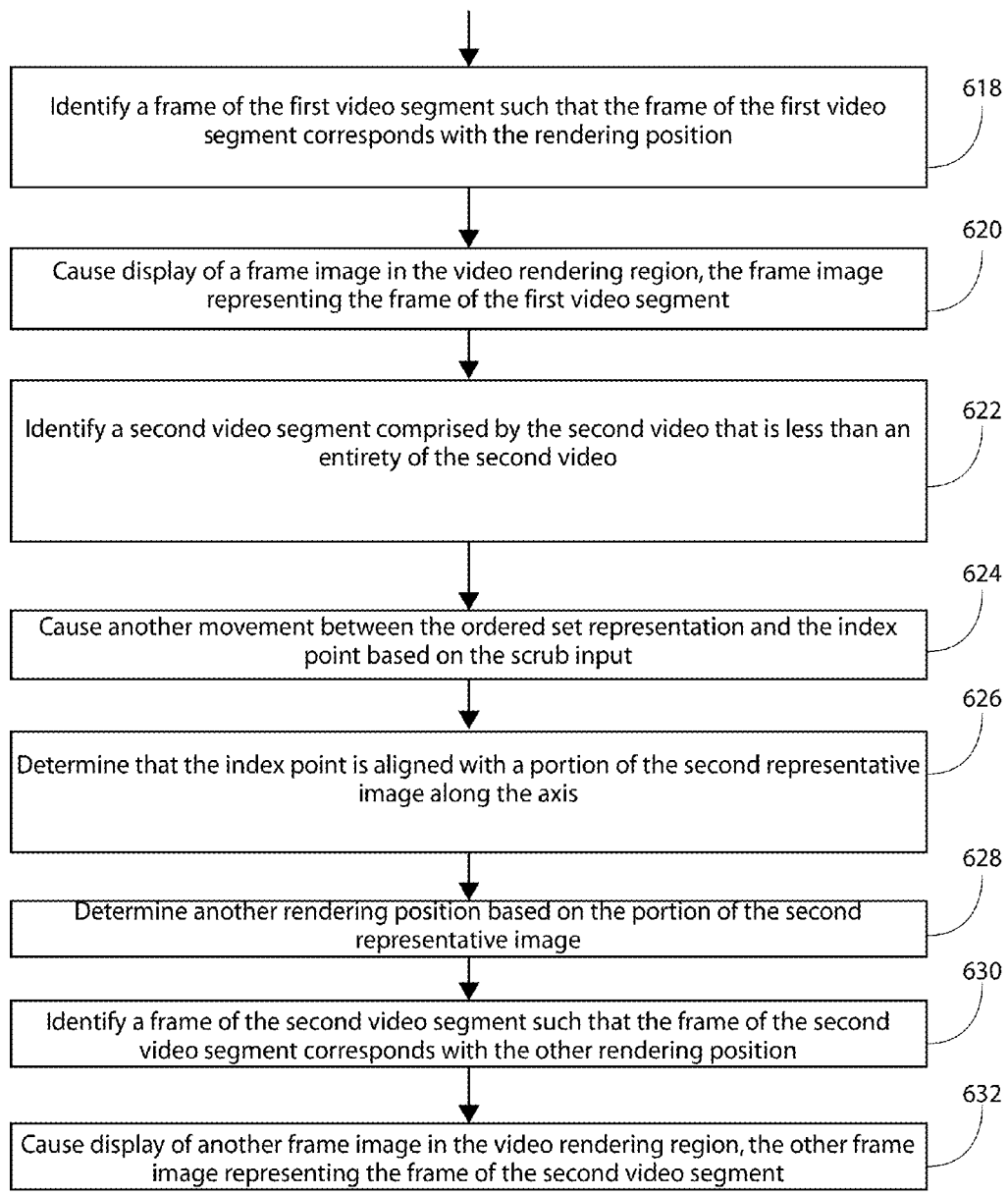

FIG. 6, included as FIG. 6-1 and FIG. 6-2, is a flow diagram illustrating activities associated with causation of display of a frame image in a video rendering region according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As previously discussed, in many circumstances, it may be desirable to allow a user to scrub through more than one video segment based, at least in part, on a scrub input associated with an ordered set representation.

At block 602, the apparatus determines an ordered set of separate videos that comprises a first video and a second video such that the second video is adjacent to and subsequent to the first video in the ordered set of separate videos. The determination, the ordered set of separate videos, the first video, and the second video may be similar as described regarding FIGS. 2A-2B, FIGS. 3A-3B, and FIGS. 4A-4D.

At block 604, the apparatus identifies a first video segment comprised by the first video that is less than an entirety of the first video. The identification and the first video segment may be similar as described regarding FIGS. 2A-2B, FIGS. 3A-3B, and FIGS. 4A-4D.

At block 606, the apparatus determines an ordered set representation that indicates the ordered set of separate videos. In at least one example embodiment, the ordered set representation comprises a first representative image that represents, at least a portion of, the first video and a second representative image that represents, at least part of, the second video, such that the first representative image and the second representative image are arranged along an axis in accordance with an ordering of the ordered set of separate videos. The determination, the ordered set representation, the first representative image, the second representative image, and the axis may be similar as described regarding FIGS. 2A-2B, FIGS. 3A-3B, and FIGS. 4A-4D.

At block 608, the apparatus causes display of at least part of the ordered set representation proximate to a video rendering region of a display. The causation of display, the part of the ordered set presentation, the video rendering region, and the display may be similar as described regarding FIGS. 2A-2B, FIGS. 3A-3B, and FIGS. 4A-4D.

At block 610, the apparatus receives information indicative a scrub input associated with the ordered set representation. The receipt and the scrub input may be similar as described regarding FIGS. 3A-3B and FIGS. 4A-4D.

At block 612, the apparatus causes movement between the ordered set representation and an index point based, at least in part, on the scrub input. The causation of movement and the index point may be similar as described regarding FIGS. 2A-2B, FIGS. 3A-3B, and FIGS. 4A-4D.

At block 614, the apparatus determines that the index point is aligned with a portion of the first representative image along the axis. The determination and the portion of the first representative image may be similar as described regarding FIGS. 2A-2B, FIGS. 3A-3B, and FIGS. 4A-4D.

At block 616, the apparatus determines a rendering position based, at least in part, on the portion of the first representative image. The determination and the rendering position may be similar as described regarding FIGS. 2A-2B, FIGS. 3A-3B, and FIGS. 4A-4D.

At block 618, the apparatus identifies a frame of the first video segment such that the frame of the first video segment corresponds with the rendering position. The identification and the frame of the first video segment may be similar as described regarding FIGS. 2A-2B, FIGS. 3A-3B, and FIGS. 4A-4D.

At block 620, the apparatus causes display of a frame image in the video rendering region, the frame image representing the frame of the first video segment. The causation of display and the frame image may be similar as described regarding FIGS. 2A-2B, FIGS. 3A-3B, and FIGS. 4A-4D.

At block 622, the apparatus identifies a second video segment comprised by the second video that is less than an entirety of the second video. The identification and the second video segment may be similar as described regarding FIGS. 2A-2B, FIGS. 3A-3B, and FIGS. 4A-4D

At block 624, the apparatus causes another movement between the ordered set representation and the index point based, at least in part, on the scrub input. The causation of the other movement may be similar as described regarding FIGS. 2A-2B, FIGS. 3A-3B, and FIGS. 4A-4D.

At block 626, the apparatus determines that the index point is aligned with a portion of the second representative image along the axis. The determination and the portion of the second representative image may be similar as described regarding FIGS. 2A-2B, FIGS. 3A-3B, and FIGS. 4A-4D.

At block 628, the apparatus determines another rendering position based, at least in part, on the portion of the second representative image. The determination and the other rendering position may be similar as described regarding FIGS. 2A-2B, FIGS. 3A-3B, and FIGS. 4A-4D.

At block 630, the apparatus identifies a frame of the second video segment such that the frame of the second video segment corresponds with the other rendering position. The identification and the frame of the second video segment may be similar as described regarding FIGS. 2A-2B, FIGS. 3A-3B, and FIGS. 4A-4D.

At block 632, the apparatus causes display of another frame image in the video rendering region, the other frame image representing the frame of the second video segment. The causation of display and the other frame image may be similar as described regarding FIGS. 2A-2B, FIGS. 3A-3B, and FIGS. 4A-4D.

Figure 7:
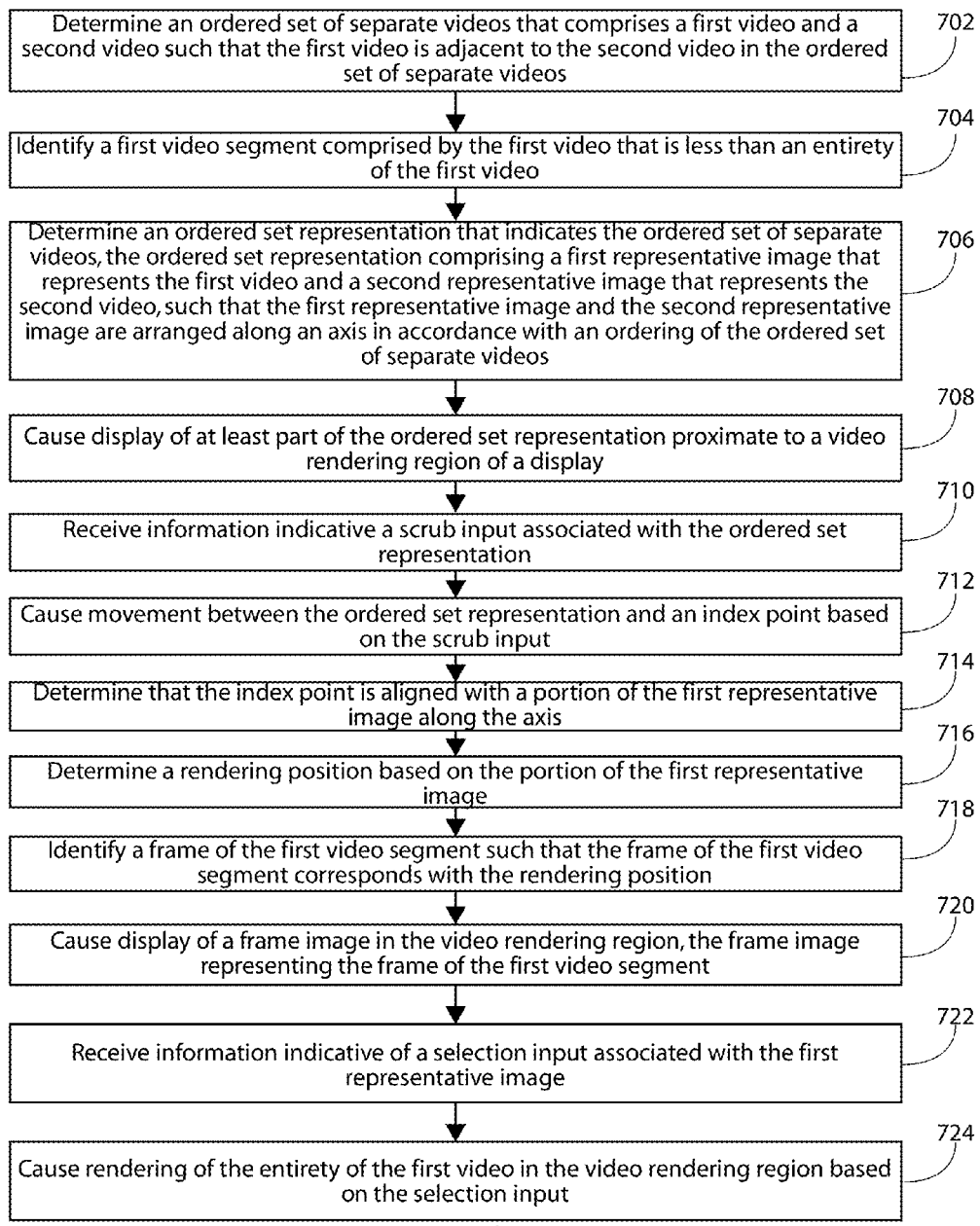
FIG. 7 is a flow diagram illustrating activities associated with causation of display of an entirety of a first video in a video rendering region according to at least one example embodiment.

FIG. 7 is a flow diagram illustrating activities associated with causation of display of an entirety of a first video in a video rendering region according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in many circumstances, it may be desirable to configure an apparatus such that a user of the apparatus may cause rendering of the entirety of a particular video by way of a selection input associated with a representative image that represents the video.

At block 702, the apparatus determines an ordered set of separate videos that comprises a first video and a second video such that the first video is adjacent to the second video in the ordered set of separate videos. The determination, the ordered set of separate videos, the first video, and the second video may be similar as described regarding FIGS. 2A-2B, FIGS. 3A-3B, and FIGS. 4A-4D.

At block 704, the apparatus identifies a first video segment comprised by the first video that is less than an entirety of the first video. The identification and the first video segment may be similar as described regarding FIGS. 2A-2B, FIGS. 3A-3B, and FIGS. 4A-4D.

At block 706, the apparatus determines an ordered set representation that indicates the ordered set of separate videos. In at least one example embodiment, the ordered set representation comprises a first representative image that represents, at least a portion of, the first video and a second representative image that represents, at least part of, the second video, such that the first representative image and the second representative image are arranged along an axis in accordance with an ordering of the ordered set of separate videos. The determination, the ordered set representation, the first representative image, the second representative image, and the axis may be similar as described regarding FIGS. 2A-2B, FIGS. 3A-3B, and FIGS. 4A-4D.

At block 708, the apparatus causes display of at least part of the ordered set representation proximate to a video rendering region of a display. The causation of display, the part of the ordered set presentation, the video rendering region, and the display may be similar as described regarding FIGS. 2A-2B, FIGS. 3A-3B, and FIGS. 4A-4D.

At block 710, the apparatus receives information indicative a scrub input associated with the ordered set representation. The receipt and the scrub input may be similar as described regarding FIGS. 3A-3B and FIGS. 4A-4D.

At block 712, the apparatus causes movement between the ordered set representation and an index point based, at least in part, on the scrub input. The causation of movement and the index point may be similar as described regarding FIGS. 2A-2B, FIGS. 3A-3B, and FIGS. 4A-4D.

At block 714, the apparatus determines that the index point is aligned with a portion of the first representative image along the axis. The determination and the portion of the first representative image may be similar as described regarding FIGS. 2A-2B, FIGS. 3A-3B, and FIGS. 4A-4D.

At block 716, the apparatus determines a rendering position based, at least in part, on the portion of the first representative image. The determination and the rendering position may be similar as described regarding FIGS. 2A-2B, FIGS. 3A-3B, and FIGS. 4A-4D.

At block 718, the apparatus identifies a frame of the first video segment such that the frame of the first video segment corresponds with the rendering position. The identification and the frame of the first video segment may be similar as described regarding FIGS. 2A-2B, FIGS. 3A-3B, and FIGS. 4A-4D.

At block 720, the apparatus causes display of a frame image in the video rendering region, the frame image representing the frame of the first video segment. The causation of display and the frame image may be similar as described regarding FIGS. 2A-2B, FIGS. 3A-3B, and FIGS. 4A-4D.

At block 722, the apparatus receives information indicative of a selection input associated with the first representative image. The receipt and the selection input may be similar as described regarding FIGS. 3A-3B and FIGS. 4A-4D.

At block 724, the apparatus causes rendering of the entirety of the first video in the video rendering region based, at least in part, on the selection input. The causation of rendering and the entirety of the first video may be similar as described regarding FIGS. 2A-2B, FIGS. 3A-3B, and FIGS. 4A-4D.

Figure 8:
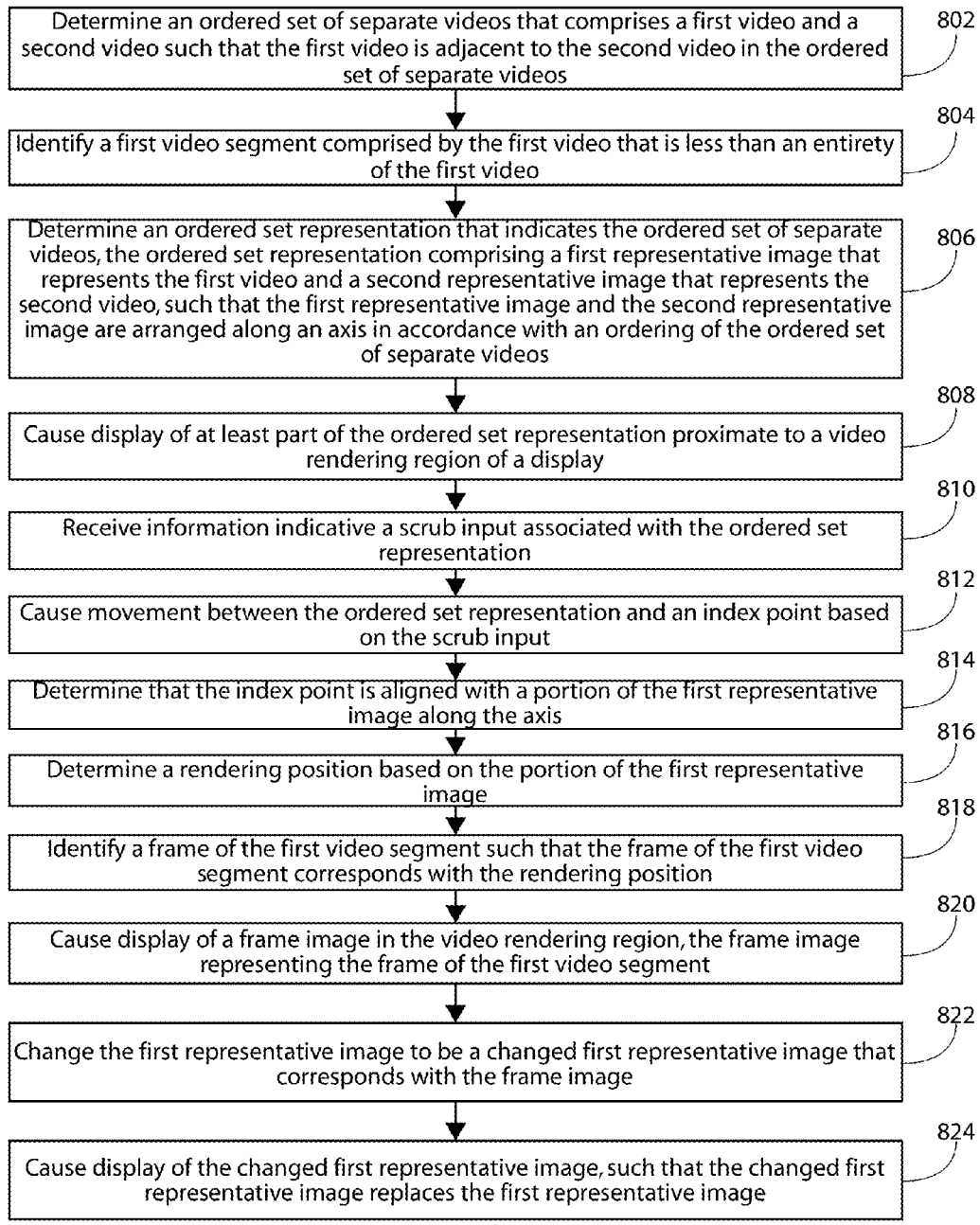
FIG. 8 is a flow diagram illustrating activities associated with causation of display of a changed first representative image according to at least one example embodiment.

FIG. 8 is a flow diagram illustrating activities associated with causation of display of a changed first representative image according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As discussed previously, in many circumstances, it may be desirable to update a representative image based, at least in part, on a frame associated with a rendering position within a video, a video segment, and/or the like. In this manner, it may be desire to configure an apparatus such that the representative image is dynamically updated as the video, video segment, etc. is rendered.

At block 802, the apparatus determines an ordered set of separate videos that comprises a first video and a second video such that the first video is adjacent to the second video in the ordered set of separate videos. The determination, the ordered set of separate videos, the first video, and the second video may be similar as described regarding FIGS. 2A-2B, FIGS. 3A-3B, and FIGS. 4A-4D.

At block 804, the apparatus identifies a first video segment comprised by the first video that is less than an entirety of the first video. The identification and the first video segment may be similar as described regarding FIGS. 2A-2B, FIGS. 3A-3B, and FIGS. 4A-4D.

At block 806, the apparatus determines an ordered set representation that indicates the ordered set of separate videos. In at least one example embodiment, the ordered set representation comprises a first representative image that represents, at least a portion of, the first video and a second representative image that represents, at least part of, the second video, such that the first representative image and the second representative image are arranged along an axis in accordance with an ordering of the ordered set of separate videos. The determination, the ordered set representation, the first representative image, the second representative image, and the axis may be similar as described regarding FIGS. 2A-2B, FIGS. 3A-3B, and FIGS. 4A-4D.

At block 808, the apparatus causes display of at least part of the ordered set representation proximate to a video rendering region of a display. The causation of display, the part of the ordered set presentation, the video rendering region, and the display may be similar as described regarding FIGS. 2A-2B, FIGS. 3A-3B, and FIGS. 4A-4D.

At block 810, the apparatus receives information indicative a scrub input associated with the ordered set representation. The receipt and the scrub input may be similar as described regarding FIGS. 3A-3B and FIGS. 4A-4D.

At block 812, the apparatus causes movement between the ordered set representation and an index point based, at least in part, on the scrub input. The causation of movement and the index point may be similar as described regarding FIGS. 2A-2B, FIGS. 3A-3B, and FIGS. 4A-4D.

At block 814, the apparatus determines that the index point is aligned with a portion of the first representative image along the axis. The determination and the portion of the first representative image may be similar as described regarding FIGS. 2A-2B, FIGS. 3A-3B, and FIGS. 4A-4D.

At block 816, the apparatus determines a rendering position based, at least in part, on the portion of the first representative image. The determination and the rendering position may be similar as described regarding FIGS. 2A-2B, FIGS. 3A-3B, and FIGS. 4A-4D.

At block 818, the apparatus identifies a frame of the first video segment such that the frame of the first video segment corresponds with the rendering position. The identification and the frame of the first video segment may be similar as described regarding FIGS. 2A-2B, FIGS. 3A-3B, and FIGS. 4A-4D.

At block 820, the apparatus causes display of a frame image in the video rendering region, the frame image representing the frame of the first video segment. The causation of display and the frame image may be similar as described regarding FIGS. 2A-2B, FIGS. 3A-3B, and FIGS. 4A-4D.

At block 822, the apparatus changes the first representative image to be a changed first representative image that corresponds with the frame image. The changing of the first representative image and the changed first representative image may be may be similar as described regarding FIGS. 2A-2B, FIGS. 3A-3B, and FIGS. 4A-4D.

At block 824, the apparatus causes display of the changed first representative image, such that the changed first representative image replaces the first representative image. The causation of display of the changed first representative image and the replacement of the first representative image may be similar as described regarding FIGS. 3A-3B and FIGS. 4A-4D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, blocks 722 and 724 of FIG. 7 may be performed before block 710 of FIG. 7. Furthermore, if desired, one or more of the above-described functions may be optional or may be combined. For example, block 824 of FIG. 8 may be optional and/or combined with block 822 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:

determination of an ordered set of separate videos that
comprises a first video and a second video such that the
first video is adjacent to the second video in the ordered
set of separate videos;
identification of a first video segment comprised by the
first video that is less than an entirety of the first video;
determination of an ordered set representation that indicates the ordered set of separate videos, the ordered set
representation comprising a first representative image
that represents, at least a portion of, the first video and
a second representative image that represents, at least
part of, the second video, such that the first representative image and the second representative image are
arranged along an axis in accordance with an ordering
of the ordered set of separate videos;
causation of display of at least part of the ordered set
representation proximate to a video rendering region of
a display;
receipt of information indicative of a scrub input associated with the ordered set representation;
causation of movement between the ordered set representation and an index point based, at least in part, on the
scrub input,
wherein the causation of movement between the ordered
set representation and the index point comprises panning of the ordered set representation such that the
index point fails to move;
determination that the index point is aligned with a
portion of the first representative image along the axis;
determination of a rendering position based, at least in
part, on the portion of the first representative image;
identification of a frame of the first video segment such
that the frame of the first video segment corresponds
with the rendering position; and
causation of display of a frame image in the video
rendering region, the frame image representing the
frame of the first video segment.

2. The apparatus of claim 1, wherein the first video comprises video information subsequent to the first video segment, the index point is aligned with an end edge of the first representative image along the axis, and the rendering position corresponds with a final frame of the first video segment.

3. The apparatus of claim 2, wherein the second video is subsequent to the first video in the ordered set of separate videos, and the memory includes computer program code configured to, working with the processor, cause the apparatus to perform:
identification of a second video segment comprised by the
second video that is less than an entirety of the second
video;
causation of another movement between the ordered set
representation and the index point based, at least in
part, on the scrub input;
determination that the index point is aligned with a
portion of the second representative image along the
axis; determination of another rendering position
based, at least in part, on the portion of the second
representative image;
identification of a frame of the second video segment such
that the frame of the second video segment corresponds
with the other rendering position; and
causation of display of another frame image in the video
rendering region, the other frame image representing
the frame of the second video segment.

4. The apparatus of claim 3, wherein the second video comprises video information prior to the second video segment, the index point is aligned with a start edge of the second representative image along the axis, and the rendering position corresponds with a start frame of the second video segment.

5. The apparatus of claim 1, wherein the identification of the first video segment is based, at least in part, on at least one of peak motion detection within the first video, slow motion playback history of the first video, or a midpoint of the first video.

6. The apparatus of claim 1, wherein the memory includes computer program code configured to, working with the processor, cause the apparatus to perform:
receipt of information indicative of a selection input
associated with the first representative image; and
causation of rendering of the entirety of the first video in
the video rendering region based, at least in part, on the
selection input.

7. The apparatus of claim 1, wherein the memory includes computer program code configured to, working with the processor, cause the apparatus to perform:
changing of the first representative image to be a changed
first representative image that corresponds with the
frame image; and
causation of display of the changed first representative
image, such that the changed first representative image
replaces the first representative image.

8. The apparatus of claim 1, wherein the determination that the index point is aligned with the portion of the first representative image along the axis comprises identifying the portion of the first representative image to correspond with a demarcation between the axis and the index point such that the demarcation is orthogonal to the axis, and the determination of the rendering position is based, at least in part, on the demarcation.

9. A method comprising:
determining an ordered set of separate videos that comprises a first video and a second video such that the first
video is adjacent to the second video in the ordered set
of separate videos;
identifying a first video segment comprised by the first
video that is less than an entirety of the first video;
determining an ordered set representation that indicates
the ordered set of separate videos, the ordered set
representation comprising a first representative image
that represents, at least a portion of, the first video and
a second representative image that represents, at least
part of, the second video, such that the first representative image and the second representative image are
arranged along an axis in accordance with an ordering
of the ordered set of separate videos;
causing display of at least part of the ordered set representation proximate to a video rendering region of a
display;
receiving information indicative of a scrub input associated with the ordered set representation;
causing movement between the ordered set representation
and an index point based, at least in part, on the scrub
input; determining that the index point is aligned with
a portion of the first representative image along the
axis;
determining a rendering position based, at least in part, on
the portion of the first representative image;
identifying a frame of the first video segment such that the
frame of the first video segment corresponds with the
rendering position; and causing display of a frame image in the video rendering region, the frame image representing the frame of the first video segment, wherein the first video comprises video information subsequent to the first video segment, the index point is aligned with an end edge of the first representative image along the axis, and the rendering position corresponds with a final frame of the first video segment.

10. The method of claim 9, wherein the second video is subsequent to the first video in the ordered set of separate videos, and further comprising:

identifying a second video segment comprised by the second video that is less than an entirety of the second video;

causing another movement between the ordered set representation and the index point based, at least in part, on the scrub input;

determining that the index point is aligned with a portion of the second representative image along the axis;

determining another rendering position based, at least in part, on the portion of the second representative image;

identifying a frame of the second video segment such that the frame of the second video segment corresponds with the other rendering position; and causing display of another frame image in the video rendering region, the other frame image representing the frame of the second video segment.

11. The method of claim 10, wherein the second video comprises video information prior to the second video segment, the index point is aligned with a start edge of the second representative image along the axis, and the rendering position corresponds with a start frame of the second video segment.

12. The method of claim 9, further comprising:

receiving information indicative of a selection input associated with the first representative image; and causing rendering of the entirety of the first video in the video rendering region based, at least in part, on the selection input.

13. The method of claim 9, wherein the determining that the index point is aligned with the portion of the first representative image along the axis comprises identifying the portion of the first representative image to correspond with a demarcation between the axis and the index point such that the demarcation is orthogonal to the axis, and the determining of the rendering position is based, at least in part, on the demarcation.

14. At least one non-transitory computer-readable medium encoded with instructions that, when executed by a processor, perform:

determination of an ordered set of separate videos that comprises a first video and a second video such that the first video is adjacent to the second video in the ordered set of separate videos; identification of a first video segment comprised by the first video that is less than an entirety of the first video;

determination of an ordered set representation that indicates the ordered set of separate videos, the ordered set representation comprising a first representative image that represents, at least a portion of, the first video and a second representative image that represents, at least part of, the second video, such that the first representative image and the second representative image are arranged along an axis in accordance with an ordering of the ordered set of separate videos;

causation of display of at least part of the ordered set representation proximate to a video rendering region of a display;

receipt of information indicative of a scrub input associated with the ordered set representation; causation of movement between the ordered set representation and an index point based, at least in part, on the scrub input;

determination that the index point is aligned with a portion of the first representative image along the axis; determination of a rendering position based, at least in part, on the portion of the first representative image;

identification of a frame of the first video segment such that the frame of the first video segment corresponds with the rendering position; and causation of display of a frame image in the video rendering region, the frame image representing the frame of the first video segment;

wherein the second video comprises video information prior to the second video segment, the index point is aligned with a start edge of the second representative image along the axis, and the rendering position corresponds with a start frame of the second video segment.

15. The at least one non-transitory computer-readable medium of claim 14, wherein the first video comprises video information subsequent to the first video segment, the index point is aligned with an end edge of the first representative image along the axis, and the rendering position corresponds with a final frame of the first video segment.

16. The at least one non-transitory computer-readable medium of claim 15, wherein the second video is subsequent to the first video in the ordered set of separate videos, and further encoded with instructions that, when executed by a processor, perform:

identification of a second video segment comprised by the second video that is less than an entirety of the second video;

causation of another movement between the ordered set representation and the index point based, at least in part, on the scrub input;

determination that the index point is aligned with a portion of the second representative image along the axis;

determination of another rendering position based, at least in part, on the portion of the second representative image;

identification of a frame of the second video segment such that the frame of the second video segment corresponds with the other rendering position; and causation of display of another frame image in the video rendering region, the other frame image representing the frame of the second video segment.

17. A method comprising:

determining an ordered set of separate videos that comprises a first video and a second video such that the first video is adjacent to the second video in the ordered set of separate videos;

identifying a first video segment comprised by the first video that is less than an entirety of the first video;

determining an ordered set representation that indicates the ordered set of separate videos, the ordered set representation comprising a first representative image that represents, at least a portion of, the first video and a second representative image that represents, at least part of, the second video, such that the first representative image and the second representative image are arranged along an axis in accordance with an ordering of the ordered set of separate videos;

causing display of at least part of the ordered set representation proximate to a video rendering region of a display;

receiving information indicative of a scrub input associated with the ordered set representation;

causing movement between the ordered set representation and an index point based, at least in part, on the scrub input; determining that the index point is aligned with a portion of the first representative image along the axis;

determining a rendering position based, at least in part, on the portion of the first representative image;

identifying a frame of the first video segment such that the frame of the first video segment corresponds with the rendering position;

causing display of a frame image in the video rendering region, the frame image representing the frame of the first video segment;

changing the first representative image to be a changed first representative image that corresponds with the frame image; and causing display of the changed first representative image, such that the changed first representative image replaces the first representative image.

18. An apparatus, comprising:

at least one processor;

at least one memory including computer program code, the memory and the computer program code configured to, working with the processor, cause the apparatus to perform at least the following:

determination of an ordered set of separate videos that comprises a first video and a second video such that the first video is adjacent to the second video in the ordered set of separate videos;

identification of a first video segment comprised by the first video that is less than an entirety of the first video;

determination of an ordered set representation that indicates the ordered set of separate videos, the ordered set representation comprising a first representative image that represents, at least a portion of, the first video and a second representative image that represents, at least part of, the second video, such that the first representative image and the second representative image are arranged along an axis in accordance with an ordering of the ordered set of separate videos;

causation of display of at least part of the ordered set representation proximate to a video rendering region of a display;

receipt of information indicative of a scrub input associated with the ordered set representation;

causation of movement between the ordered set representation and an index point based, at least in part, on the scrub input;

determination that the index point is aligned with a portion of the first representative image along the axis;

determination of a rendering position based, at least in part, on the portion of the first representative image;

identification of a frame of the first video segment such that the frame of the first video segment corresponds with the rendering position; and causation of display of a frame image in the video rendering region, the frame image representing the frame of the first video segment, wherein the identification of the first video segment is based, at least in part, on at least one of peak motion detection within the first video, slow motion playback history of the first video, or a midpoint of the first video.

* * * * *